(12) United States Patent
Yamamoto

(10) Patent No.: US 6,724,504 B1
(45) Date of Patent: Apr. 20, 2004

(54) IMAGE READING SYSTEM AND IMAGE READING DEVICE

(75) Inventor: Yasuhiro Yamamoto, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/480,460

(22) Filed: Jan. 11, 2000

(30) Foreign Application Priority Data

Jan. 12, 1999 (JP) .......................................... P11-005279

(51) Int. Cl.[7] .............................. H04N 1/04; G03B 27/32
(52) U.S. Cl. ........................ 358/487; 358/505; 355/27; 396/311
(58) Field of Search ................................ 358/487, 505, 358/506, 527; 355/27, 40; 396/311, 313, 319

(56) References Cited

U.S. PATENT DOCUMENTS 5,550,938 A * 8/1996 Hayakawa et al. ............ 385/8
6,044,180 A * 3/2000 Brandestini et al. ........ 382/274
6,222,613 B1 * 4/2001 Haraguchi et al. ............ 355/40
6,331,903 B1 * 12/2001 Nakazawa et al. .......... 358/487

* cited by examiner

*Primary Examiner*—Edward Coles
*Assistant Examiner*—Jason Sherrill
(74) *Attorney, Agent, or Firm*—Greenblum & Bernstein, P.L.C.

(57) ABSTRACT

The image reading system comprises an image reading device and a computer, which can be connected to the image reading device to operate it. In the image reading device, a film, in which an image is recorded, is regularly intermittently moved, so that the image is read by a line sensor. In a pre-scanning operation, the film is moved with a pitch which is coarser than that of a regular scanning operation, so that a pre-view image is read by the line sensor, and is displayed on a screen of a liquid crystal display device. A control bar, indicated on the screen along with the pre-view image, is operated by handling a track ball and a click button, so that an image quality of the pre-view image is adjusted. Namely, even in a stand-alone mode in which the image reading device is operated independently from the computer, the image quality of the pre-view image can be adjusted.

7 Claims, 8 Drawing Sheets

IMAGE READING SYSTEM AND IMAGE READING DEVICE

BACKGROUND OF THE INVENTION

1. Field of the Invention

The present invention relates to an image reading system in which an image, recorded in a film, for example, is read by an optical sensor, and more particularly to a construction by which an image quality of a pre-view image read with a relatively coarse pitch is adjusted.

2. Description of the Related Art

Conventionally, there is known an image reading system constructed in such a manner that an image, recorded in a film, is read by a line sensor in a film scanner, and is then displayed on a screen of a display device of a computer connected to the film scanner. In this image reading system, prior to a regular scanning operation which is carried out with a relatively fine pitch to record a final image in a recording medium, a pre-scanning operation is performed with a relatively coarse pitch.

A pre-view image, obtained by the pre-scanning operation, is displayed by the display device, so that the user can adjust various parameters so as to obtain a desired image quality, while viewing the pre-view image. The adjusting operation is performed by, for example, dragging a control bar, indicated on a screen of the display device, using a mouse. In the computer, a predetermined calculation is performed in accordance with the adjusted parameters, so that an adjusted pre-view image is indicated on the screen of the display device.

However, an adjustment of an image quality of the pre-view image can be performed only through a computer, and thus only a pre-view image having a default image quality can be displayed.

SUMMARY OF THE INVENTION

Therefore, an object of the present invention is to provide an image reading system and device in which an image quality of a pre-view image can be adjusted even in the stand-alone mode.

According to the present invention, there is provided an image reading device including a pre-scanning processor, an image display processor, an image quality adjustment information input processor and an image quality adjusting processor.

The pre-scanning processor reads an image, recorded in a read object, with a first pitch which is coarser than a second pitch used in a regular scanning operation in which the image is read as a final reading operation, so that a pre-view image is obtained. The image display processor displays the pre-view image. The image quality adjustment information input processor inputs information for adjusting an image quality of the pre-view image. The image quality adjusting processor adjusts an image quality of the pre-view image in accordance with the information.

Further, according to the present invention, there is provided an image reading system including a housing, a pre-scanning processor, an image display processor, an image quality adjustment information input processor, an image quality adjusting processor and an external device.

The pre-scanning processor reads an image, recorded in a read object, with a first pitch which is coarser than a second pitch used in a regular scanning operation in which the image is read as a final reading operation, so that a pre-view image is obtained, the pre-scanning processor being provided in the housing. The image display processor displays the pre-view image, the image display processor being provided in the housing. The image quality adjustment information input processor inputs information for adjusting an image quality of the pre-view image, and is provided in the housing. The image quality adjusting processor adjusts an image quality of the pre-view image in accordance with the information, and is provided in the housing. The external device is provided outside of the housing, and can process an image signal corresponding to the image. The image quality adjusting processor is provided only to the housing.

Furthermore, according to the present invention, there is provided an image reading device including a scanning processor, an image display processor, an image quality adjustment information input processor and an image quality adjusting processor.

The scanning processor reads an image recorded in a read object. The image display processor displays the image read by the scanning processor. The image quality adjustment information input processor inputs information for adjusting an image quality of the image. The image quality adjusting processor adjusts an image quality of the image in accordance with the information.

BRIEF DESCRIPTION OF THE DRAWINGS

The present invention will be better understood from the description of the preferred embodiment of the invention set forth below, together with the accompanying drawings, in which.

DESCRIPTION OF THE PREFERRED EMBODIMENT

Figure 1:
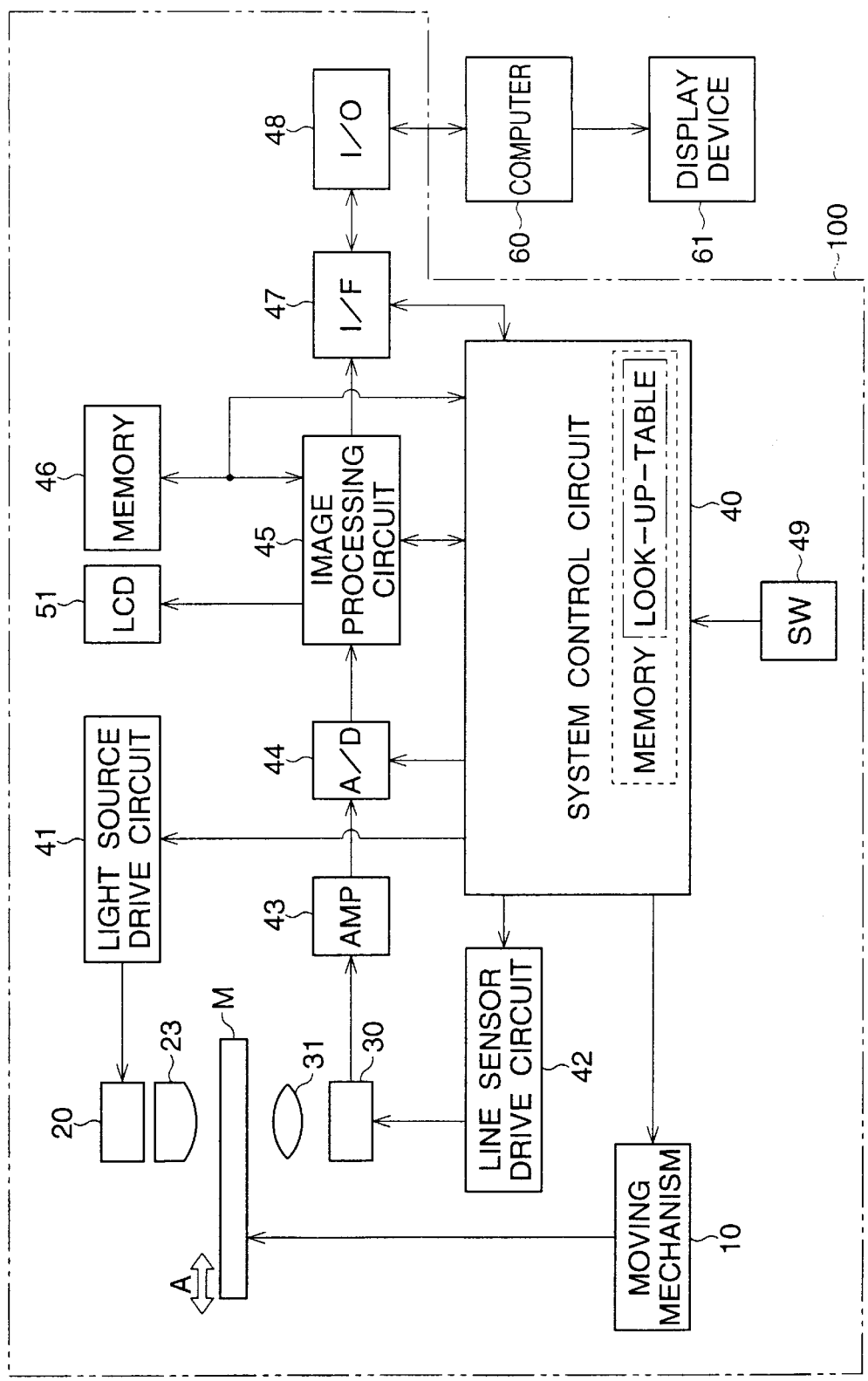
FIG. 1 is a block diagram showing an image reading system of an embodiment of the present invention.

The present invention will be described below with reference to an embodiment shown in the drawings.

FIG. 1 shows an image reading system of an embodiment of the present invention. The image reading system has an image reading device 100, which is a film scanner, and a computer 60, which can control the image reading device 100, and can display an image read by the image reading device 100 through a display device 61. Namely, the computer 60 is an external device provided outside of the image reading device 100, and can process an image signal corresponding to the image.

A read object M handled by this image reading device is a transparent negative film on which a color image has been recorded. The film M is intermittently moved, by a moving mechanism 10, in a direction shown by an arrow A.

A light source 20 and a cylindrical lens 23, provided below the light source 20, are disposed above a path along which the film M is moved. A line sensor (i.e., an optical sensor) 30 and a forming lens 31, provided above the line sensor 30, are disposed under the path. The light source 20 is connected to a light source drive circuit 41, so that the light source 20 can be turned ON and OFF. The line sensor 30 is connected to a line sensor drive circuit 42, so that the color image can be read by the line sensor 30. The moving mechanism 10, the light source drive circuit 41 and the line sensor drive circuit 42 are controlled in accordance with a command signal outputted by a system control circuit 40.

The line sensor 30 is provided with a plurality of photo-diodes, which are aligned rectilinearly, whereby an electric signal, corresponding to the amount of light received by the photo-diode, is generated in each of the photo-diodes. The electric signal (i.e. the pixel data), read through the line sensor 30, is amplified by an amplifier 43 and is converted to a digital signal by an A/D converter 44. The digital pixel data are subjected to an image process, such as a shading correction, in an image processing circuit 45, and are then stored in a memory 46.

The digital pixel data, subsequent to being read from the memory 46, are subjected to various correction processes, such as a color correction and a gamma correction. The corrected digital pixel data are output to a liquid crystal display device 51 connected to the image processing circuit 45, so that a color image is displayed by the liquid crystal display device 51. Further, the corrected digital pixel data are converted to a signal, which conforms to a predetermined format, by an interface circuit 47. The image processing circuit 45 and the interface circuit 47 are controlled by the system control circuit 40.

The image signal output from the interface circuit 47 is output through an input/output terminal 48 to the computer 60 provided outside of the image reading device 100. Thus, the color image is displayed by the display device 61.

Note that a switch 49, including a track ball 52 and a click button 53 (see FIG. 3), is connected to the system control circuit 40.

Figure 2:
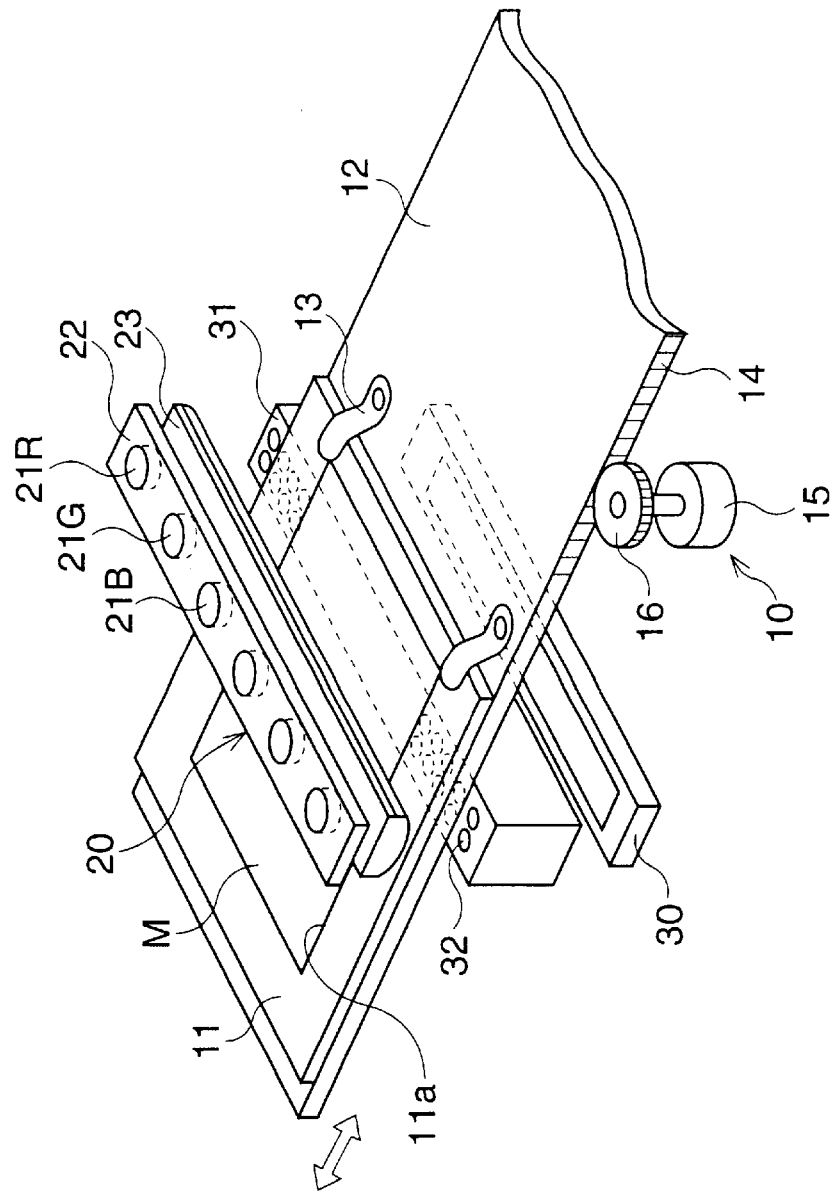
FIG. 2 is a perspective view showing a moving mechanism, a light source and a line sensor.

FIG. 2 shows the moving mechanism 10, the light source 20 and the line sensor 30. The negative film M is supported by a frame 11, which is fixed on a plate stage 12 by at least one fastener 13. An opening (not shown) is formed in the stage 12 at a position corresponding to the film M, so that a light beam radiated onto the film M can pass through the film M. A rack 14 is formed on a side surface of the stage 12. A pinion 16 fixed on an output shaft of a feeding motor 15 is meshed with the rack 14. The feeding motor 15, which is a stepping motor, for example, is driven under control of the system control circuit 40, so that the position of the film M is controlled.

The light source 20, positioned above the stage 12, is provided with light-emitting diodes 21R, 21G and 21B, which radiate R(red), G(green) and B(blue) light beams, respectively. Note that, although only six light-emitting diodes are shown in FIG. 2, further light-emitting diodes may be provided. The light-emitting diodes 21R, 21G and 21B, supported by a slender support member 22, which extends in a breadth direction of the stage 12, are arranged in this order uniformly along the support member 22. This order can be changed in accordance with necessity.

The cylindrical lens 23, positioned between the support member 22 and the stage 12, is extended in parallel with the support member 22. Namely, light emitted by the light-emitting diodes 21R, 21G and 21B is condensed in a direction in which the stage 12 is moved, by the cylindrical lens 23, so that a line-shaped light beam is radiated onto the film M.

The line sensor 30 is positioned under the light source 20, leaving a space therebetween, such that the stage 12 can be interposed between the light source 20 and the line sensor 30. The line sensor 30, the light source 20 and the cylindrical lens 23 are parallel to each other. Namely, the line sensor 30 extends in a direction approximately perpendicular to a direction in which the film M is moved. The forming lens 31 is provided between the line sensor 30 and the stage 12. The forming lens 31, composed of a rod lens array 32, extends parallel to the line sensor 30. Accordingly, when a light beam is emitted onto the film M, by the light source 20, the image recorded in the film M is formed on the light receiving surface of the line sensor 30, through the forming lens 31.

The frame 11 is a plate which is made of plastic material or cardboard, and a rectangular opening 11a is formed in the frame 11. The shape of the opening 11a corresponds to an image frame of the film M. The frame 11 is formed by superimposing two plate members having the same shape, and the film M is sandwiched between the plate members.

Figure 3:
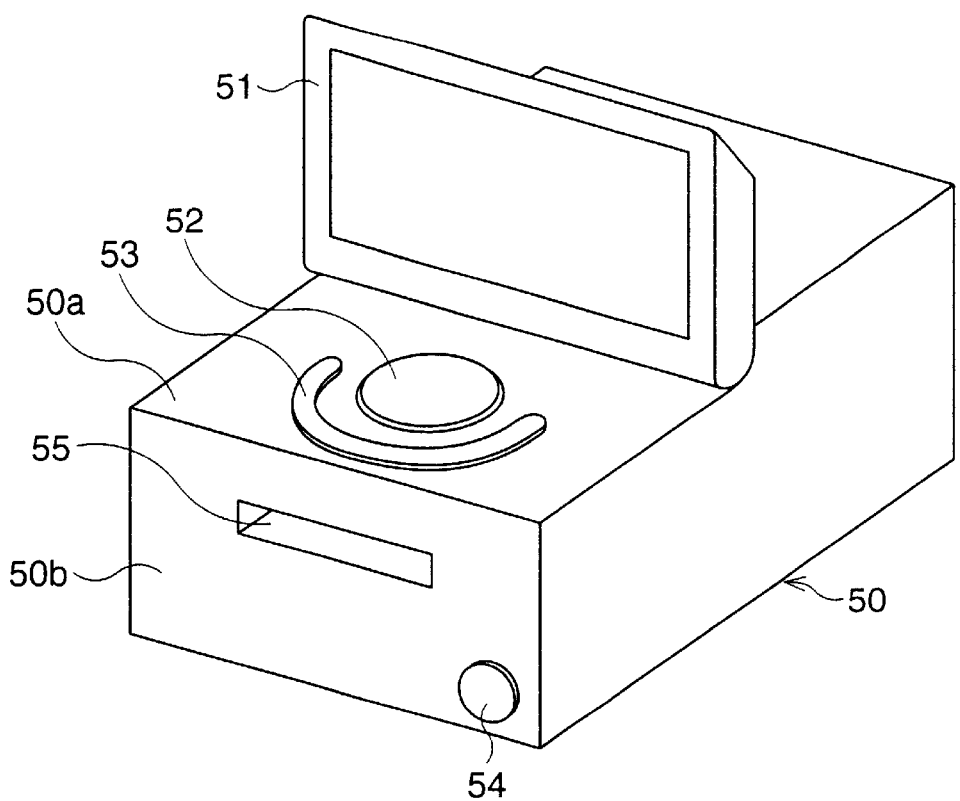
FIG. 3 is a perspective front-side view of an image reading device.

FIG. 3 is a perspective front-side view of the image reading device 100, which has a housing 50. In the image reading device 100, all of the components, except for the liquid crystal display device 51 and the switch 49 are provided in the housing 50.

The liquid crystal display device 51 is provided on an upper surface 50a of the housing 50. The liquid crystal display device 51 is used for indicating an image in a stand-alone mode in which the image reading device 100 is operated independently from the computer 60. The track ball 52 and the click button 53 are arranged in front of the liquid crystal display device 51. The track ball 52 is used for moving a cursor or pointer indicated on the screen of the liquid crystal display device 51. The click button 53 is used for selecting a button indicated on the screen or moving a control bar indicated on the screen.

A front surface 50b of the housing 50 is provided with an electric power switch 54 for turning ON and OFF the electric power, and a film inlet mouth 55, through which the film M (FIG. 1) is mounted on the stage 12 (FIG. 2).

Figure 4:
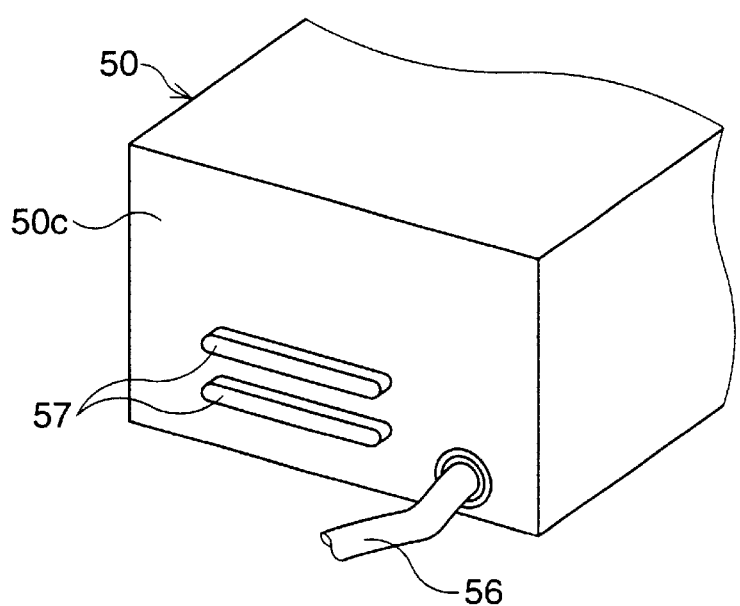
FIG. 4 is a perspective rear-side view of the image reading device.

FIG. 4 is a perspective rear-side view of the image reading device. An electric power cable 56, for supplying an electric power to electric circuits provided in the image reading device 100, is connected to a rear surface 50c of the housing 50. Further, the rear surface 50c is provided with connectors 57, for connecting the computer 60, a printer, a data storage device and so on to the image reading device 100.

Figure 5:
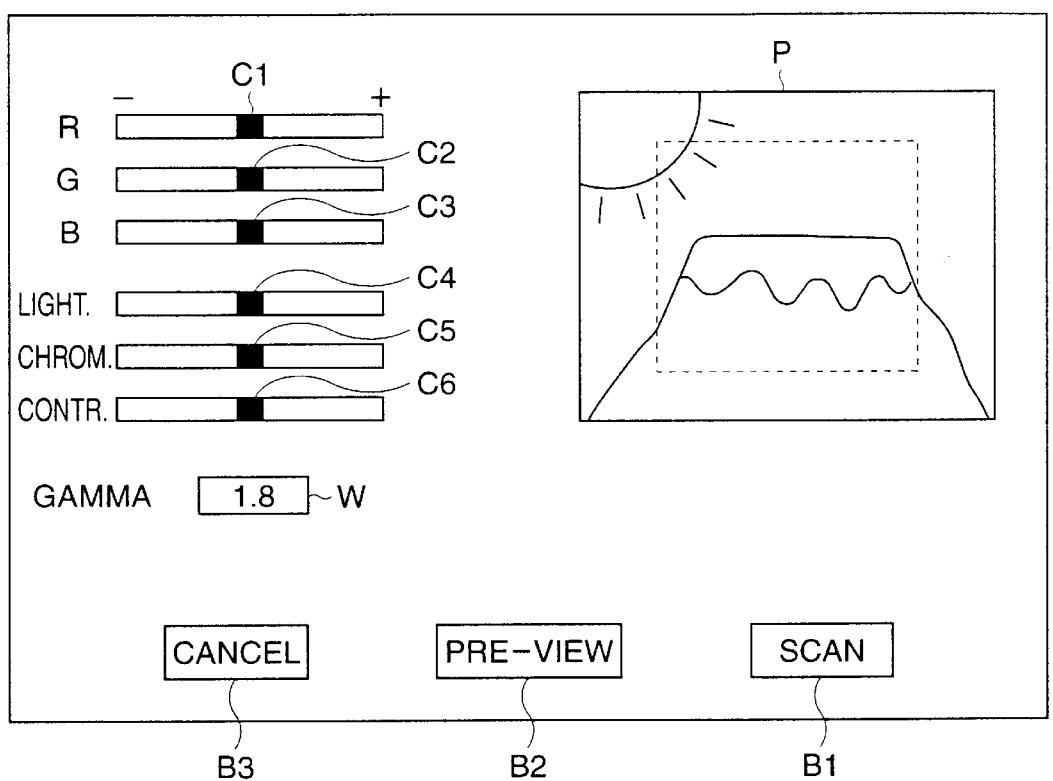
FIG. 5 is a view showing an example of a screen of a liquid crystal display device of the image reading device or a screen of a display device connected to a computer.

FIG. 5 shows an example of a screen of the liquid crystal display device 51 of the image reading device 100 or a screen of the display device 61 connected to the computer 60. In the image reading device 100, prior to a regular scanning operation which is a final reading operation of an image recorded in the film M, a pre-scanning operation is performed. In the pre-scanning operation, the image is read with a first pitch coarser than a second pitch of the regular scanning operation. On the screen shown in FIG. 5, a pre-view image P obtained by the pre-scanning operation is indicated.

A scanning button B1 for starting the regular scanning operation, a pre-view button B2 for starting a pre-scanning operation or a pre-view operation, and a cancel button B3 for stopping a reading operation of the film M, which is mounted on the image reading device 100, are provided below the pre-view image P.

On the left side of the pre-view image P, gain control bars C1, C2 and C3 for adjusting colors of the image are provided. When the control bar C1 is moved rightward on the screen, a gain regarding a red color is increased, so that a redness is enhanced in the color image. Conversely, when the control bar C1 is moved leftward on the screen, the gain regarding the red color is diminished. Similarly, when the control bars C2 and C3 are moved rightward, gains regarding a green color and a blue color are increased, and when the control bars C2 and C3 are moved leftward, the gains regarding the green color and the blue color are decreased.

Below the gain control bars C1, C2 and C3, a lightness control bar C4, a chroma control bar CS and a contrast control bar C6 are provided. When the control bar C4 is moved rightward on the screen, a lightness is enhanced in the color image, and when the control bar C4 is moved leftward, the lightness is diminished. When the control bar C5 is moved rightward, the chroma is enhanced, and when the control bar C5 is moved leftward, the chroma is diminished. When the control bar C6 is moved rightward, the contrast is enhanced, and when the control bar C6 is moved leftward, the contrast is diminished.

A window W, in which a gamma correction coefficient used for carrying out a gamma correction is indicated, is provided below the control bars.

A cursor is indicated on the screens of the liquid crystal display device 51 and the display device 61. The cursor is moved by rotating the track ball 52, and the control bars C1 through C6, the window W, the buttons B1, B2 and B3 are selected and actuated by placing the cursor thereon. The buttons B1, B2 and B3 are turned ON and OFF by clicking the click button 53, or clicking the mouse connected to the computer 60. The control bars C1 through C6 are moved by rotating the track ball 52, or by dragging the mouse. The gamma correction coefficient indicated in the window W can be changed by clicking the click button 53 or the mouse.

Figure 6:
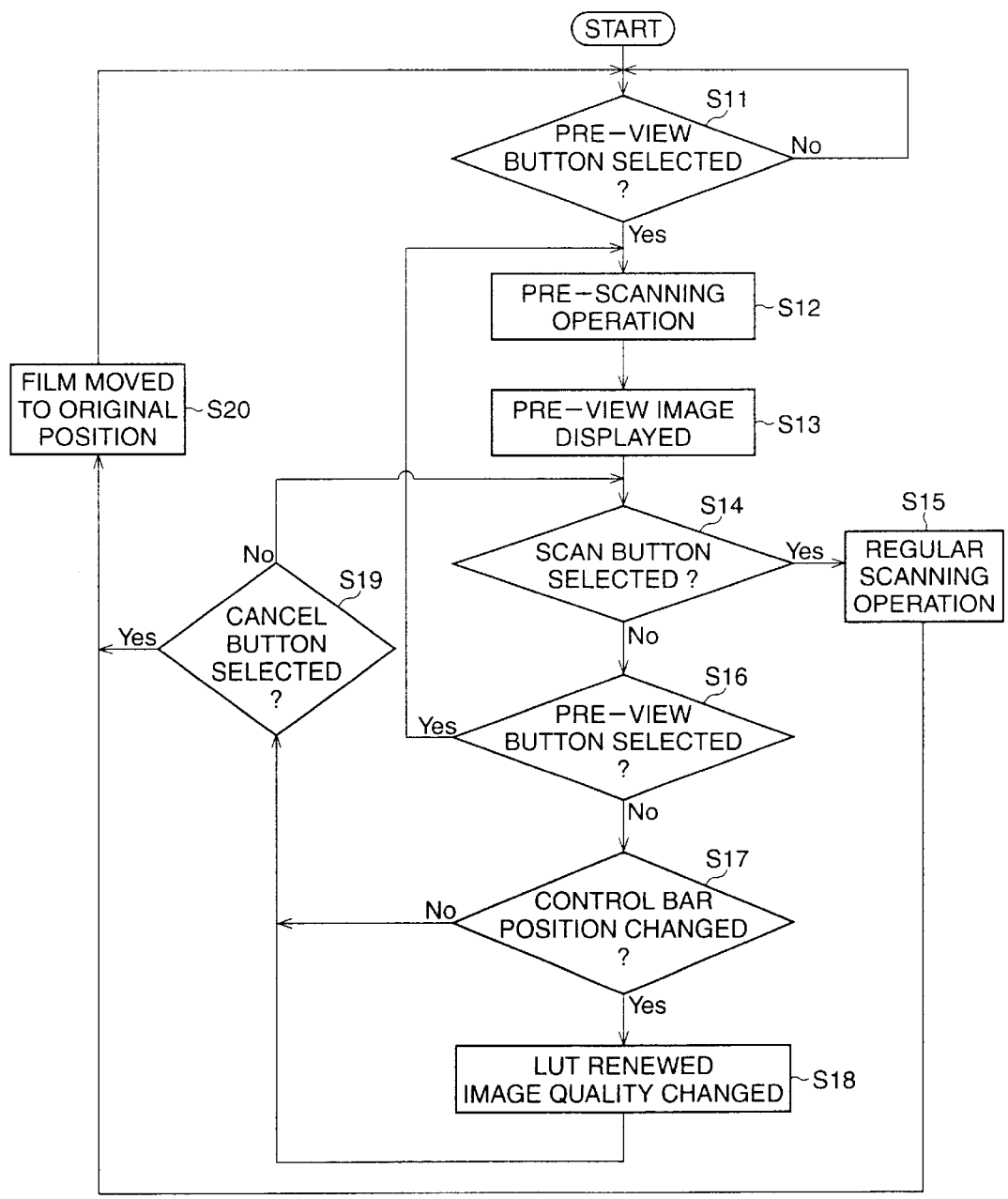
FIG. 6 is a flowchart of a program of an image reading operation which is performed in a stand alone mode in the image reading device.

FIG. 6 is a flowchart of a program of an image reading operation which is performed by the image reading device 100 in a stand-alone mode, i.e., in a state in which the computer 60 is not connected to the image reading device 100. In the stand alone mode, a printer or a data storage device may be connected to the image reading device 100. Note that, prior to a start of the image reading operation, the stage 12 is positioned at a predetermined original point.

In Step S11, it is determined whether the pre-view button B2 (FIG. 5) indicated on the screen of the liquid crystal display device 51 has been selected. Step S11 is repeatedly executed so far as the pre-view button B2 is not selected, and when the pre-view button B2 is selected, Step S12 is executed in which a coarse reading operation (i.e., a pre-scanning operation) is carried out. Namely, the film M is regularly intermittently moved by the moving mechanism 10 with the first pitch which is coarser than the second pitch of a regular scanning operation performed in Step S15. During the intermittent movement, the light source 20 is controlled in such a manner that the light-emitting diodes 21R, 21G and 21B are lit in a predetermined order every time the stage 21 is stopped, so that R, G and B pixel data of the image recorded in the film M are sensed. In Step S13, a pre-view image P obtained by the pre-scanning operation is displayed on the screen of the liquid crystal display device 51.

In Step S14, it is determined whether the scanning button B1 has been selected. When the scanning button B1 is selected, Steps S15 is executed in which a regular scanning operation is carried out. Namely, the film M is regularly intermittently moved by the moving mechanism 10 with the second pitch which is finer than that of the pre-scanning operation. During the intermittent movement of the regular scanning operation, similarly to the pre-scanning operation, the light-emitting diodes 21R, 21G and 21B are lit in a predetermined order every time the stage 21 is stopped, so that R, G and B pixel data of the image recorded in the film M are sensed. The pixel data are transmitted to the printer or the data storage device, which is connected to the image reading device 100. Then, Step S20 is executed in which the moving mechanism 10 is driven, and thus the stage 12, i.e., the film M is resumed to the original or start position. The routine goes back to Step S11, and thus processing described above is again executed.

Conversely, when it is determined in Step S14 that the scan button B1 has not been selected, Step S16 is executed in which it is determined whether the pre-view button B2 has been again selected. When the pre-view button B2 has been again selected, the routine goes back to Step S12, so that Steps S12 through S14 are again executed.

When it is determined in Step S16 that the pre-view button B2 has not been selected, the routine goes to Step S17, in which it is determined whether a position of any one of the control bars Cl through C6 indicated on the screen of the liquid crystal display device 51 has been changed, and it is determined whether a value of the gamma correction coefficient indicated in the window W has been changed. When the position of any one of the control bars or the value of the gamma correction coefficient has been changed, Step S18 is executed, in which a look-up-table (LUT) corresponding to the control bar, the position of which has been changed, or a look-up-table of the gamma correction coefficient is referred to, and is renewed in accordance with the changed value. Note that the look-up-tables are provided in a memory in the system control circuit 40. Further, in accordance with the renewed look-up-table, an image quality of the pre-view image P displayed on the screen of the liquid crystal display device 51 is adjusted. For example, when the position of the gain control bar C1 is changed, the gain of red color of the pre-view image P is adjusted.

In the look-up-tables relating to the gain control of red, green and blue colors, data according to formula (1) are stored in predetermined addresses.

$$y'=y \times k1 \ (0.5 \leq k1 \leq 1.5) \tag{1}$$

wherein y corresponds to an address, and y' corresponds to data. k1 is a gain control coefficient, and is changed between 0.5 and 1.5 in accordance with the position of the control bar. For example, when k1 is 0.8, pixel data y'=68, which has been subjected to a gain control, is stored in the address of y=85, and when the gain control coefficient k1 is changed to 0.7, the data stored in the address is changed to y'=59.5.

In the look-up-table relating to a change of the contrast, data according to formula (2) are stored in predetermined addresses.

$$y'=(y-128) \times k2+128 \ (-0.5 \leq k2 \leq 0.5) \tag{2}$$

wherein the contrast adjustment coefficient k2 is changed between −0.5 and 0.5.

When it is determined in Step S17 that the positions of the control bars and the value of the gamma correction have not been changed, or after the pre-view image P is changed in Step S18, Step S19 is executed, in which it is determined whether the cancel button B3 has been selected. When the cancel button B3 has been selected, Step S20 is executed in which the film M is returned to the original position, and the routine goes back to Step S11. Accordingly, by changing the frame 11, an image recorded in a different film can be read. Conversely, when it is determined in Step S19 that the cancel button B3 has not been selected, the routine goes back to Step S14.

As described above, in the stand-alone mode, information such as the gain control coefficient k1 and the contrast adjustment coefficient k2, by which an image quality is adjusted, is input by operating the control bars and so on, indicated on the screen of the liquid crystal display device 51, with the track ball 52 or the click button 53. Then, by referring to the look-up-table which is renewed in accordance with the information of the image quality, the image quality of the pre-view image is adjusted. Namely, even in the stand-alone mode, the image quality of the pre-view image is freely adjusted in accordance with a requirement of the user.

Figure 7A:
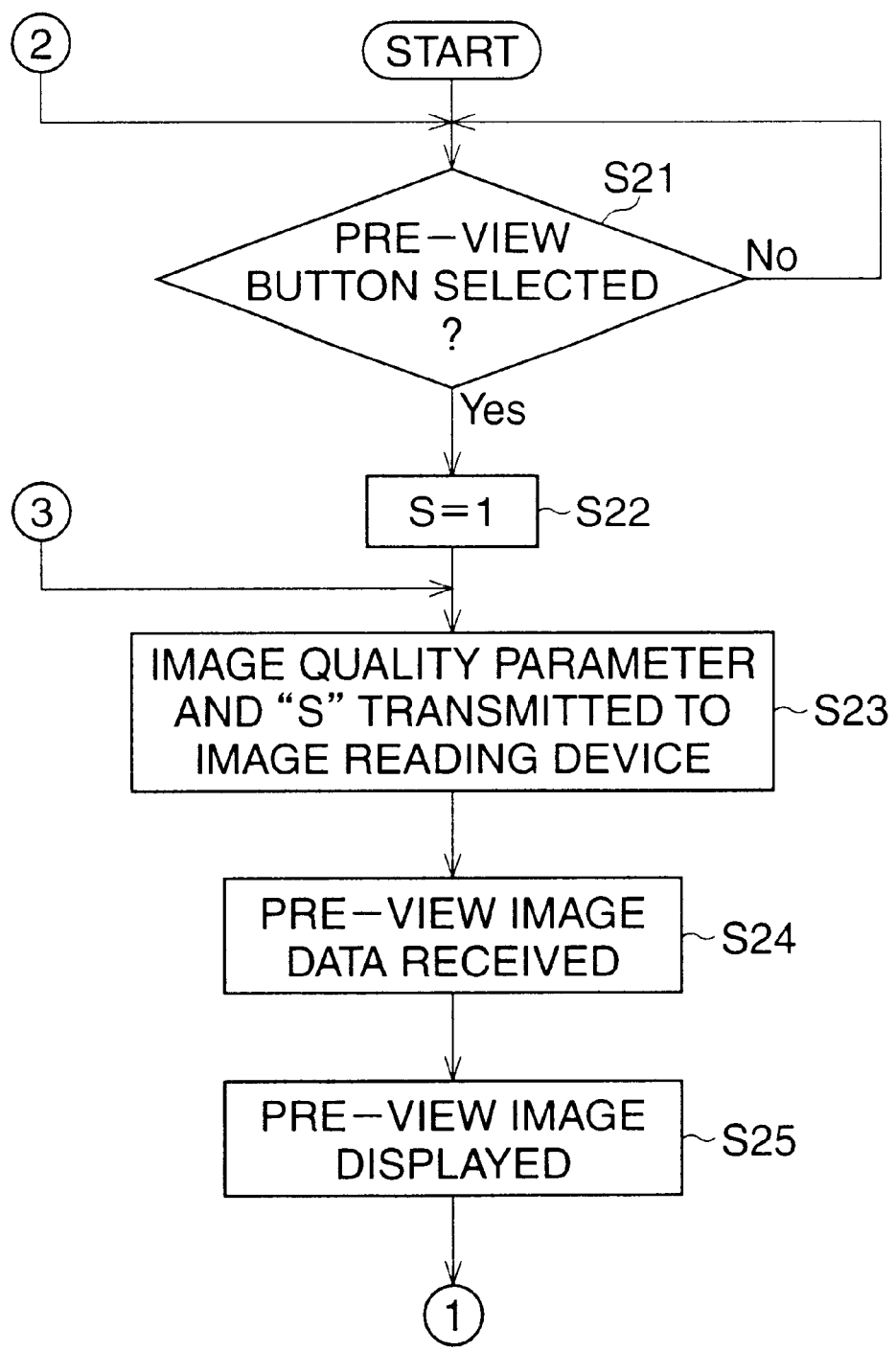
FIGS. 7A and 7B are a flowchart of a program of an image reading operation which is performed in a computer mode in a computer.
Figure 7B:
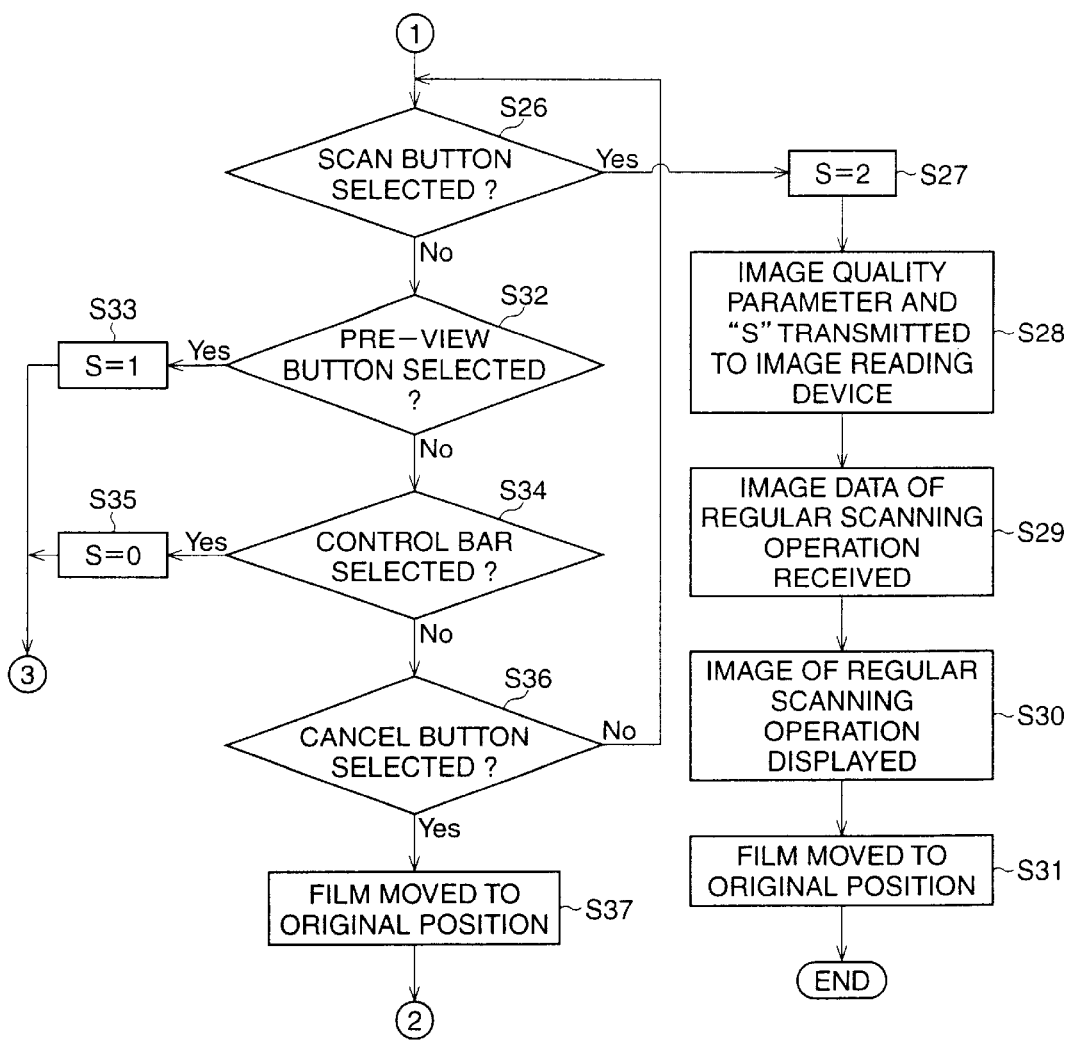
Figure 8:
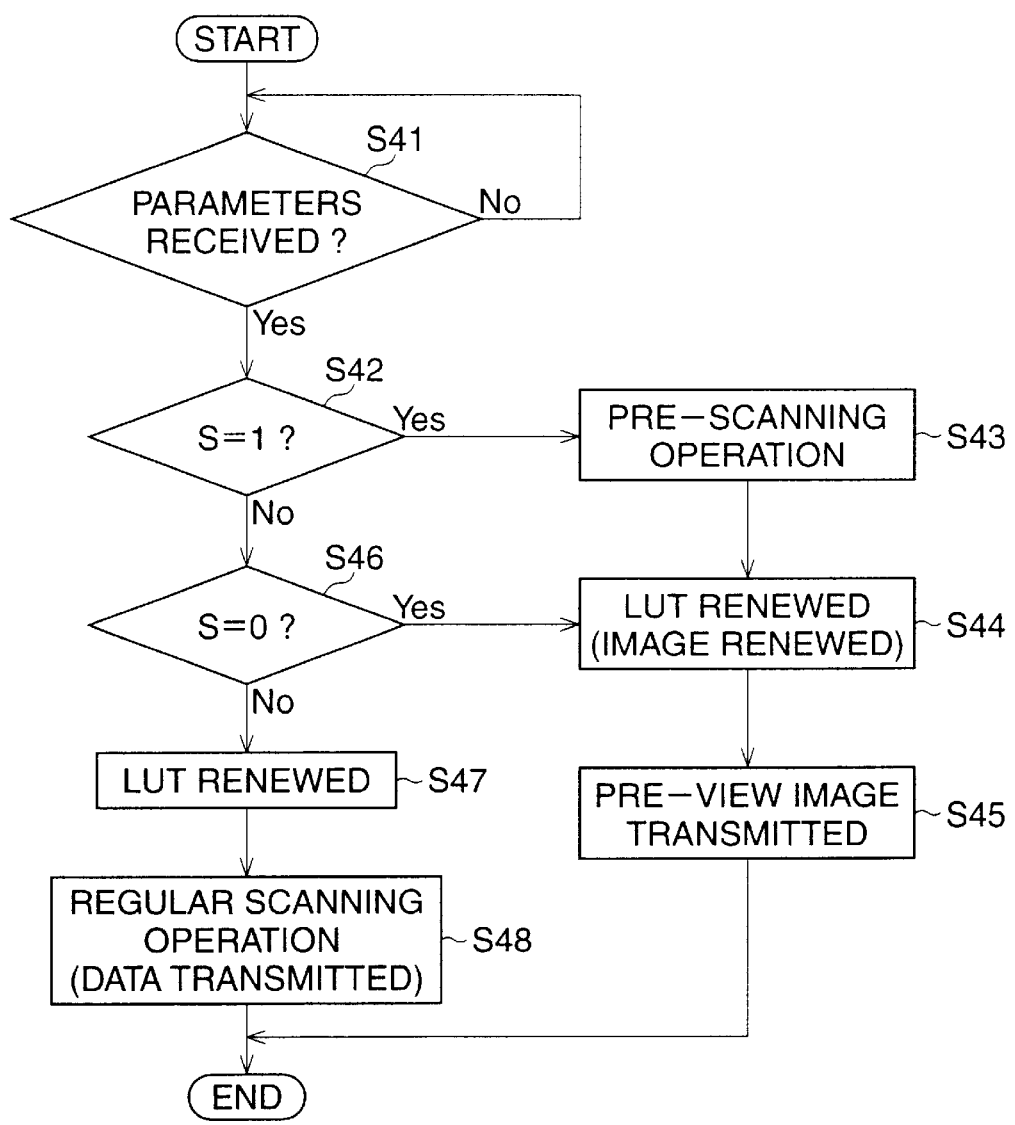
FIG. 8 is a flowchart of a program of the image reading operation which is performed in the computer mode in the image reading device.

FIGS. 7A, 7B and FIG. 8 show flowcharts of programs of an image reading operation of a computer mode, i.e., in a state in which the computer 60 is connected to the image reading device 100. The program shown in FIGS. 7A and 7B is executed in the computer 60, and the program shown in FIG. 8 is executed in the image reading device 100. Note that prior to a start of the image reading operation, the stage is set to a predetermined original position.

In the program of the computer shown in FIGS. 7A and 7B, it is determined in Step S21 whether the pre-view button B2 (FIG. 5) indicated on the screen of the display device 61 has been selected. Step S21 is repeatedly executed while the pre-view button B2 is not selected, and when the pre-view button B2 is selected, Step S22 is executed in which a parameter S is set to "1". In Step S23, image quality parameters and the parameter S are transmitted to the image reading device 100. The image quality parameters (i.e., image quality adjustment information) include the gain control coefficients (k1 of formula (1), for example) determined in accordance with the positions of the control bars C1 through C6, and the gamma correction coefficient. When Step S23 is executed for the first time, the image quality parameters have been set to predetermined default values. In the image reading device 100, a pre-scanning operation is carried out in accordance with the image quality parameters and the parameter S (=1), as described later.

In Step S24, data of the pre-view image sensed by the image reading device 100 is received therefrom. In Step S25, the pre-view image is displayed, based on the data, on the screen of the display device 61.

In Step S26, it is determined whether the scan button B1 has been selected on the screen of the display device 61. When the scan button B1 has been selected, the routine goes to Step S27 in which the parameter S is set to "2". Then, in Step S28, the image quality parameters and the parameter S are transmitted to the image reading device 100, so that, in the image reading device 100, a regular scanning operation is carried out in accordance with the image quality parameters and the parameter S (2), as described later.

In Step S29, data of the image, obtained by the regular scanning operation of the image reading device 100, is received therefrom. In Step S30, the image of the regular scanning operation is displayed, based on the data, on the screen of the display device 61, and the image data is recorded in a recording medium mounted in the computer 60. In Step S31, a command signal, by which the film M is returned to the original position by the moving mechanism 10, is output to the image reading device 100, and then this program ends.

When it is determined in Step S26 that the scan button B1 has not been selected, Step S32 is executed in which it is determined whether the pre-view button B2 has been again selected. When the pre-view button B2 has been selected, Step S33 is executed in which the parameter S is set to "1". Then, the routine goes back to Step S23, so that Steps S23 through S25 are again executed. Thus, in the image reading device 100, the pre-scanning operation is again carried out, so that a pre-view image is indicated by the display device 61.

Conversely, when it is determined in Step S32 that the pre-view button B2 has not been selected, Step S34 is executed in which it is determined whether a position of any one of the control bars C1 through C6 indicated on the screen of the display device 61 has been changed, and it is determined whether a value of the gamma correction coefficient indicated in the window W has been changed. When the position of any one of the control bars or the value of the gamma correction coefficient has been changed, Step S35 is executed, in which the parameter S is set to "0". Then, the routine goes back to Step S23, so that Steps S23 through S25 are again executed. In the image reading device 100, the look-up-table is renewed, and thus the pre-view image is renewed in accordance with a calculation, as described later. The renewed pre-view image is displayed by the display device 61 in Step S25.

When it is determined in Step S34 that the positions of the control bars and the value of the gamma correction have not been changed, Step S36 is executed, in which it is determined whether the cancel button B3 has been selected. When the cancel button B3 has been selected, Step S37 is executed. Namely, a command signal, by which the film M is returned to the original position by the moving mechanism 10, is output to the image reading device 100, and then the routine goes back to Step S21. Accordingly, by changing the frame 11, an image recorded in a different film can be read. Conversely, when it is determined in Step S36 that the cancel button B3 has not been selected, the routine goes back to Step S26.

In the program of the image reading device 100 shown in FIG. 8, Step S41 is repeatedly executed until the image quality parameters or the parameter S is received. When the image quality parameters or the parameter S is received, it is determined in Step S42 whether the parameter S is "1". When the parameter S is "1", Step S43 is executed in which a coarse reading operation (i.e., a pre-scanning operation) is carried out. Then, in Step S44, the look-up-table is renewed in accordance with the image quality parameters, so that the pre-view image is renewed. In Step S45, data of the pre-view image is transmitted to the computer 60, and this program ends.

When it is determined in Step S42 that the parameter S is not "1", Step S46 is executed in which it is determined whether the parameter S is "0". When the parameter S is "0", Steps S44 and S45 are executed, so that the pre-view image is renewed, and the data of the renewed pre-view image is transmitted to the computer 60, and the program ends. Thus, when the parameter S is "0", i.e., when any one of the control bars is changed on the screen of the display device 61 of the computer 60 (see Step S34 of FIG. 7B), in the image reading device 100, a pre-scanning operation is not performed, but a calculation is carried out based on a pre-scanned image, originally obtained by the image reading device 100, and the renewed image quality parameters, so that the renewed pre-view image is obtained.

When it is determined in Step S46 that the parameter S is not "0", i.e., when the parameter S is "2", Step S47 is executed, in which a look-up-table is renewed in accordance with the renewed quality parameters, and Step S48 is then executed, in which a regular scanning operation is performed. Data of an image obtained by the regular scanning operation is transmitted to the computer 60, and the program ends. The image is displayed by the display device 61 in Step S30 of FIG. 7B.

As described above, according to the embodiment, in the image reading device which can be operated in the stand-alone mode, an image quality of the pre-view image obtained in a pre-scanning operation can be adjusted. Further, in the embodiment, a function in which the image quality of the pre-view image is adjusted, i.e., a function in which the look-up-table is renewed, is provided only in the image reading device 100, and is not provided in the computer 60. Therefore, a load in an image processing in the computer 60 is low, and thus, a structure of the software for the computer 60 can be simplified.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 11-5279 (filed on Jan. 12, 1999) which is expressly incorporated herein, by reference, in its entirety.

What is claimed is:

1. An image reading system comprising:

a housing;

a pre-scanning processor that reads an image, recorded in a read object, with a first pitch which is coarser than a second pitch used in a regular scanning operation in which said image is read as a final reading operation, so that a pre-view image is obtained, said pre-scanning processor being provided in said housing;

an image display processor that displays said pre-view image, said image display processor being provided in said housing;

an image quality adjustment information input processor that inputs information for adjusting an image quality of said pre-view image, said image quality adjustment information input processor being provided in said housing;

an image quality adjusting processor that adjusts an image quality of said pre-view image in accordance with said information, said image quality adjusting processor being provided to said housing; and an external device provided outside of said housing, said external device being configured to process an image signal corresponding to said image;

wherein the image quality adjusting processor adjusts an image quality in accordance with information output from the external device when the external device is operably connected to the housing, and wherein the image quality adjusting processor adjusts an image quality in accordance with information output from the image quality adjusting information input processor when the external device is not connected to the housing.

2. The device according to claim 1, wherein said pre-scanning processor comprises an optical sensor.

3. The device according to claim 1, wherein said image display processor comprises a liquid crystal display device.

4. The device according to claim 1, wherein said image quality adjusting processor adjusts at least one of a color, a lightness, a chroma and a contrast of said pre-view image.

5. The system according to claim 1, wherein said external device comprises an external image display processor that displays said pre-view image.

6. The system according to claim 1, wherein said external device comprises an external image quality adjustment information input processor that inputs information for adjusting an image quality of said pre-view image, and an information transmitting processor that transmits a parameter corresponding to said information to an electronic circuit provided in said housing, said image quality being adjusted by said electronic circuit.

7. The system according to claim 1, further comprising an adjusted pre-view image transmitting processor that transmits an adjusted pre-view image, obtained by adjusting said pre-view image in accordance with said parameter, to said external device.

* * * * *